(12) United States Patent
Kanaparthi et al.

(10) Patent No.: US 10,800,691 B2
(45) Date of Patent: Oct. 13, 2020

(54) REMOVAL OF SULFIDES IN SPENT CAUSTIC STREAM OVER ACTIVE SOLID PHASE CATALYSTS

(71) Applicant: Hindustan Petroleum Corporation Ltd, Maharashtra (IN)

(72) Inventors: Ramesh Kanaparthi, Karnataka (IN); Peddy Venkat Chalapathi Rao, Karnataka (IN); Nettem Choudary Venkateswarlu, Karnataka (IN); Sriganesh Gandham, Karnataka (IN)

(73) Assignee: HINDUSTAN PETROLEUM CORPORATION LTD., Mumbai (IN)

( * ) Notice: Subject to any disclaimer, the term of this patent is extended or adjusted under 35 U.S.C. 154(b) by 249 days.

(21) Appl. No.: 15/309,593

(22) PCT Filed: May 6, 2015

(86) PCT No.: PCT/IB2015/053304
§ 371 (c)(1),
(2) Date: Nov. 8, 2016

(87) PCT Pub. No.: WO2015/170265
PCT Pub. Date: Nov. 12, 2015

(65) Prior Publication Data
US 2017/0174544 A1    Jun. 22, 2017

(30) Foreign Application Priority Data

May 8, 2014 (IN) .......................... 1599/MUM/2014

(51) Int. Cl.
*B01J 23/00* (2006.01)
*B01J 23/72* (2006.01)
(Continued)

(52) U.S. Cl.
CPC ............. *C02F 11/08* (2013.01); *B01J 23/007* (2013.01); *B01J 23/72* (2013.01); *B01J 23/75* (2013.01);
(Continued)

(58) Field of Classification Search
CPC .. C02F 1/66; C02F 1/725; C02F 11/06; C02F 2103/365; C02F 2301/066;
(Continued)

(56) References Cited

U.S. PATENT DOCUMENTS 3,023,084 A    2/1962 Thomas, Jr.
3,963,611 A    6/1976 Dardenne-Ankringa, Jr.
(Continued)

FOREIGN PATENT DOCUMENTS

WO    00/00285 A1    1/2000
WO    2013/002535 A2    1/2013

OTHER PUBLICATIONS

Carlos, T.M.S. et al., "Wet Air Oxidation of Refinery Spent Caustic: A Refinery Case Study", Technical Report No. 427, Presented as NPRA Conference, San Antonio, TX, Sep. 12, 2000.
(Continued)

*Primary Examiner* — Lucas A Stelling
(74) *Attorney, Agent, or Firm* — Maschoff Brennan

(57) ABSTRACT

The present subject matter relates to the development of active catalyst composite based on supported transition metal oxides, especially, Cu, Co that are effective in the removal sulfides in the diluted spent caustic. The process for the reduction of sulfides in spent caustic comprises of reacting various organic and inorganic sulfides with molecular oxygen in the presence of active catalyst at various reaction temperatures ranging ambient to 200° C. and pres-
(Continued)

sures between atmospheric pressure to 60 bars. The process also relates to complete scheme for the removal of sulfides in spent caustic.

5 Claims, 3 Drawing Sheets

(51) Int. Cl.
*B01J 23/75* (2006.01)
*B01J 27/02* (2006.01)
*B01J 29/14* (2006.01)
*C02F 1/66* (2006.01)
*C02F 1/72* (2006.01)
*C02F 11/08* (2006.01)
*C02F 101/10* (2006.01)
*C02F 103/36* (2006.01)

(52) U.S. Cl.
CPC ............ *B01J 27/02* (2013.01); *B01J 29/143* (2013.01); *C02F 1/725* (2013.01); *C02F 1/66* (2013.01); *C02F 2101/101* (2013.01); *C02F 2103/365* (2013.01); *C02F 2301/066* (2013.01)

(58) Field of Classification Search
CPC .... C02F 2101/101; B01J 23/007; B01J 23/72; B01J 23/75; B01J 27/02; B01J 29/143
See application file for complete search history.

(56) References Cited

U.S. PATENT DOCUMENTS

| | | | |
|---|---|---|---|
| 5,082,571 A | 1/1992 | Beula et al. | |
| 5,246,597 A | 9/1993 | Jenson et al. | |
| 5,552,063 A | 9/1996 | Yan | |
| 6,576,144 B1 * | 6/2003 | Vineyard | C02F 1/725 |
| | | | 210/175 |
| 6,797,184 B2 * | 9/2004 | Shiota | B01J 21/18 |
| | | | 210/762 |
| 2013/0008858 A1 | 1/2013 | Howdeshell et al. | |
| 2014/0140906 A1 | 5/2014 | Song et al. | |

OTHER PUBLICATIONS

Rathore, V. et al., "Catalytic oxidation of spent caustic", PTQ, 2011, Quarter 3.

Sheu, S. et al., "Treatment f Olefin Plant Spent Caustic by Combination of Neutralization and Fenton Reaction", Wat. Res. 2001, vol. 35, No. 8, pp. 2017-2021.

Zermeno-Montante, I. et al., "Catalytic Wet Air Oxidation of Sodium Sulfide Solutions. Effect of the Metal-Support and Acidity of the Catalysts", Topics in Catalysis, vol. 54, pp. 579-586, 2011.

* cited by examiner

REMOVAL OF SULFIDES IN SPENT CAUSTIC STREAM OVER ACTIVE SOLID PHASE CATALYSTS

FIELD OF INVENTION

The subject matter described in general relates to the development of active solid phase mixed oxide catalyst composite for the removal of sulfides in dilute spent caustic using air or molecular oxygen as oxidants. In particular, the present invention relates to finding the active metals, metal oxides and support systems, optimizing the composition of metal, and reaction parameters over the suitable catalyst for the removal of sulfides in spent caustic. The invention also relates to the design of the process for the complete removal of sulfides in the aqueous spent caustic solutions.

BACKGROUND

The refineries are currently processing more and more sour crudes because of attractive economics that result in the production of higher toxic $H_2S$, mercaptans, and other sulfur containing compounds in the various hydrocarbon streams. On the other hand, the removal of sulfur to achieve ultra-low sulfur levels in different product hydrocarbon streams in meeting various environmental regulations is an increasingly important challenge. For this purpose, a dilute caustic stream is the cheap and widely used extractive reagent for the removal of sulphur containing compounds in hydrocarbons and termed as the "spent caustic". Since the spent caustic majorly contains sulphide/mercaptans compounds that potentially cause the fouling or metallurgical damage to the refinery's equipment, effective effluent treatment procedures are required for its adequate disposal. Generally, the spent caustic properties vary from various sources and have the pH above 12 and sulphides concentration ranging from 0.5 to 4.0 wt %. Spent caustic, depending on the source, also contain other impurities such as phenols, mercaptane, amines and other organic compounds. Oxidation of sulfidic content in the spent caustic to eliminate sulphides, mercaptans and combust toxic hydrocarbons/organic contaminants is practised in the refinery to transform the toxic sulphides. But commercially available oxidation processes using peroxide treatment or ozonolysis routes are costly and pose various operational challenges. Therefore, there is a need to develop an alternate, suitable, linexpensive, robust and environmental friendly process for the conversion of sulphidic/mercaptans compound into water soluble and less toxic sulphate salts.

Specifically, the spent caustic solution contains sodium hydroxide, sodium carbonate, sodium sulfides, mercaptanes, phenols and emulsified hydrocarbons. These compounds are classified as hazardous waste, odorous and resistant to the biological treatment. Specifically, sulphur containing compounds such as dissolved $H_2S$, $Na_2S$, NaHS, RSNa (sodium mercaptide) are present in the spent caustic. The spent caustic also consist of organic sulphides that accompanies with other contaminants such as phenolics and naphthenic acids.

Removal of sulfides in spent caustic can be achieved by both physical and chemical methods. Wet air oxidation (WAO), an effective method, is proposed to remove the organic pollutants at high temperatures (>200° C.) and high pressure (>150 bar) [1]. Although, the wet air oxidation is an effective method to meet the environmental regulations, the process is expensive due to severe process conditions, high cost of oxidants and further process safety is another concern. Fenton reagent ($Fe^{2+}/H_2O_2$), effective for organic removal in aqueous solutions, can oxidize the refractory pollutants at relative low temperatures and pressures. However, this process consumes large quantities of $H_2O_2$ and high concentration of $H_2S$ that react with ferric ion result in the loss of catalyst efficiency. Moreover, the pH has to be adjusted acidic range.

Specifically, in order to convert the sulfides in spent caustic various oxidation routes have been proposed viz $H_2O_2$ oxidation, oxidation using cobalt pthalocyanin and wet air oxidation. $H_2O_2$ treatment operates at ambient temperature and atmospheric pressure. This process removes sulphides and phenols by oxidation. On the other hand, the treatment with $H_2O_2$ is associated with high capital and functional costs. Stoichiometrically, 4 Kg of $H_2O_2$ is required to treat 1 Kg of sulphides. Oxidation using cobalt pthalocyanin homogeneous catalysts has the problems with separation of used catalysts and efficiency. On the other hand, wet air oxidation is a promising route to remove the sulfides and also reduces the hydrocarbons in the feed stream. Primarily, in the wet air oxidation, the reactive sulfides are converted to soluble thiosulfate, sulfite and sulfates. The treated stream will be suitable for the biological treatment in the waste water plants. In order to operate the process under milder reaction conditions WAO in the presence of a suitable catalyst is proposed. Owing to the benefits of the catalytic wet air oxidation this invention describes the development of an efficient catalyst and optimal reaction conditions for the removal of sulfides below 5 ppm.

Na$_2$S+4H$_2$O$_2$=Na$_2$SO$_4$+4H$_2$O (alkaline pH)

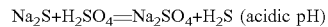

Na$_2$S+H$_2$SO$_4$=Na$_2$SO$_4$+H$_2$S (acidic pH)

Wet air oxidation is an aqueous phase oxidation process using molecular oxygen contained in air (or any other oxygen containing gas) as an oxidant. The process operates at elevated temperatures and pressures ranging from 120° C. (248° F.) to 320° C. (608° F.) and 760 kPa (110 psig) to 21000 kPa (3000 psig), respectively. The summary of wet air oxidation reactions can be presented as following:

2Na$_2$S+2O$_2$→Na$_2$SO$_4$    Eq; 1

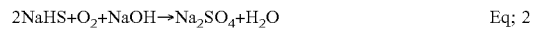

2NaHS+O$_2$+NaOH→Na$_2$SO$_4$+H$_2$O    Eq; 2

NaRS+3O$_2$+2NaOH→Na$_2$SO$_4$+RCOONa+2H    Eq; 3

(Naphthenics)+O$_2$→HNaCO$_3$+RCOONa    Eq; 4

(Crecyclics)+O$_2$→HNaCO$_3$+RCOONa    Eq; 5

NaRS+O$_2$+H$_2$O→RSSR+NaOH    Eq; 6

Various routes for treating sulphides in spent caustic have been proposed including: Neutralization/acidification, Incineration, Chemical precipitation, Chemical oxidation, Wet oxidation, Catalytic wet oxidation, Biological oxidation.

The following are the various advantages of wet air oxidation (1) effective for variable sulphides level in the feed, (2), the method is not limited by the presence of dissolved solids, (3) compatible to bio treatment process, (4) doesn't require any further neutralization, (6) relative low operating cost.

Recently, authors reported effective homogeneous catalyst based on cobalt pthalocyanin and its derivatives as a replacement for the $H_2O_2$ by the wet air oxidation route [7]. U.S. Pat. No. 3,023,084 demonstrated wet air oxidation of sulfides in spent caustic at 204° C. and 35 bar pressure and steam is employed as the stripping gas. Sulfides in the feed treated at 3480 and 8960 ppm and the final sulfide in the product is 0 and 154 ppm respectively. The reaction temperature and pressures are of 138° C. and 126° C., 2.57 and 1.37 bars. U.S. Pat. No. 3,963,611 discussed that the removal sulfides in spent caustic is achieved at temperature of 135° C. and pressure of 11 bars with residence time of 2.5 h with liquid feed rate of 178 lts/min. Prior to the reaction the pH is adjusted to below 9.6. 90% of sulfides conversion is achieved starting with 3780 ppm. U.S. Pat. No. 5,082,571 demonstrated that sulfide removal was attempted via wet oxidation route at 200° C. for sixty minutes. U.S. Pat. No. 5,246,597 demonstrated that the method of reducing sulfide content in aqueous system. The reagents in this invention are $H_2O_2$ and $ClO_2$. Combination of $ClO_2$ and $H_2O_2$ resulted in reducing sulfides level from 100 to 10 ppm. NPRA report presented at San Antonio discussed wet air oxidation system for the treatment of spent caustic. It has stated that WAO characteristic is the formation of carboxylic acids and partially short chain organics in addition to $CO_2$ and $H_2O$. The reaction temperature and pressure are 260° C. and 90 bars. The recent paper published in Topics in catalysis 54(2011) 579 discusses demerits of non-catalytic system and evaluated vanadium and copper catalysts and found that the most active catalyst is Cu/Silica and V/clinoptilolite and achieved the complete oxidation in 20 and 26 min, respectively. In further search for the efficient catalysts combinations of Co—Mn was recently studied at 200° C.

OBJECTS OF THE INVENTION

It is an object of this invention to provide a process for treating sulphides containing spent caustic.

It is another object of this invention to provide a catalytic process by identifying the active metal oxide combinations for removing sulfides from a spent caustic stream.

It is a further object of this invention to provide a process for removing mercaptans and phenols from a spent caustic stream.

Another object of this invention is to remove or extract odorous compounds from a spent caustic stream.

Another object of this invention is to provide a suitable and an active catalyst in the removal of sulphides in spent caustic.

Another object of this invention is to provide the suitable process parameters to operate for the catalytic wet air oxidation in the batch mode.

It is yet another object of this invention to provide a scheme for carrying out the above processes.

It is yet another object of this invention is to provide a route to completely remove the sulphides in spent caustic.

It is yet another object of this invention is to identify the effective pre-treatment method for the above process.

STATEMENT OF INVENTION

Accordingly, the present invention provides a process for removal of sulphides in spent caustic comprising: conducting wet air oxidation in the presence of a catalyst composition, wherein the catalyst composition comprises a support material and a modifying agent, wherein the modifying agent is selected from an oxide of transition metal, or a derivative thereof, and the support material is present in an amount from 2 wt % to 50 wt %.

In an embodiment of the present invention, the modifying agent is anchored, impregnated, exchanged or simply contacted to a surface of the support in or outside of pores of support.

In an embodiment of the present invention, the modifying agent is transition metal selected from Co, Cu or a derivative thereof in an amount of up to about 20.0 wt %.

In an embodiment of the present invention, the support material is selected from a bulk oxide, metal phosphate or a zeolite.

In an embodiment of the present invention, the support material is a bulk oxide selected from alumina, zirconia, titania, silica or niobia; or a combination thereof or a zeolite with varying Si/Al ratios between 20 to 280 and wherein the zeolite is a faujazite-type zeolite such as X type zeolite and the metal phosphates such as Hydroxyapatite.

In an embodiment of the present invention, the catalyst has a surface area of from about 20 to about 700 $m^2/g$ and a pore volume of from about 0.10 to about 1.5 cc/g.

In an embodiment of the present invention, the process converts sulfidic content in the spent caustic or diluted spent caustic or simply in water solutions, the catalyst composition comprising a catalyst with a support and a modifying agent and wherein the oxidizing agent is air or oxygen.

In an embodiment of the present invention, the process comprises steps of neutralization and adsorption.

In an embodiment of the present invention, the process further comprises of adsorption of sulphides on different carbon forms.

In an embodiment of the present invention, the process removes impurities from waste water or diluted spent caustic that have other organic impurities comprising phenols, napthenic acid components and mercaptans by wet air oxidation in the presence of the catalyst, wherein the wet air oxidation is conducted in batch mode at a temperature from about 250 to about 450° C. and pressures between ambient to 60 bar with reaction duration between 30 min to 8 h.

In an embodiment of the present invention, the removal of sulphides is above 95% in spent caustic.

SUMMARY

Catalytic wet air oxidation of sulfidic content in diluted spent caustic stream over various transition metal oxides supported on alumina, calcium hydroxyapatites, and X-zeolites is described. The catalysts were tested at various reaction temperatures, catalyst to feed ratio, stir speeds, time intervals and pressures. The synthesized catalysts were found to be active for the removal sulfides in the refinery spent caustic. Initial screening results show that using of solid catalyst to remove sulfides has showed effective oxidation of sulfides. Co—X zeolite that has been synthesized using ion exchange method showed 72 wt % sulfide conversions at 80° C. using zero air as an oxidant with reaction duration of four hours. However, the increase in temperature to 150° C. in combination with reaction pressure to 60 bars the sulphides reduction is achieved improved conversions. The above alternative route has several advantages compared to others in terms of separation and reusing the catalyst. Moreover, active metals such as Co and Cu will not affect the final specifications after the treatment. Based on the above promising results to the optimization of the reaction conditions carried out including temperature, pressure, catalyst amount, catalyst to feed ratios. The sulphuric acid pre-treatment prior to conducting the oxidation has been investigated. This process can be used as such by completely replacing the existing $H_2O_2$ treatment or in combination to improve the economics as well as meeting stringent specifications.

DETAILED DESCRIPTION

Figure 1:
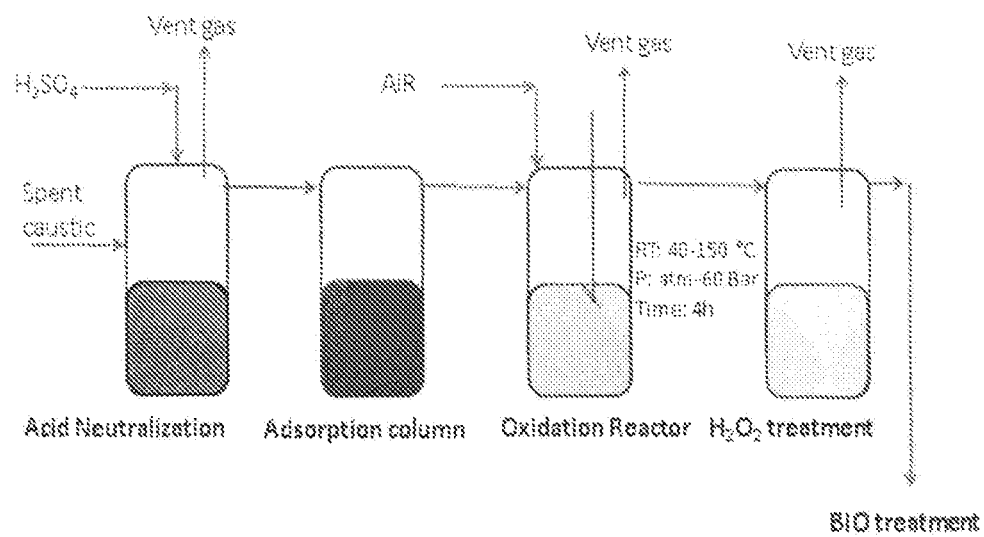
FIG. 1: illustrates proposed scheme for the removal of sulphides in spent caustic.

The invention is described in detail in the following paragraphs by way of reference to various examples. However, such description is provided merely for illustrative purposes and should not be construed as limiting the scope of the invention.

Catalytic Wet Air Oxidation

The sulfidic content with initial sulphides content between 3000 to 8000 ppm is used as feed. The wet air oxidation is carried out at both atmospheric pressure and high pressures ranging from 1 to 60 bar and temperatures between 60 to 200° C. Typically 20 to 50 ml of spent caustic feed is loaded in the reactor and catalyst amounts from 10 ppm to 1 g of catalyst have been loaded. The catalytic experiments were conducted with duration of 1 to 8 h using zero air as an oxidant. The catalytic tests were conducted using PARR reactors. The product sample is collected and analysed using titration method.

Sulfide Estimation

The determination of sulfide in spent caustic was carried out by iodometric titration method. In a typical titration, take 1 ml of spent caustic in 100 ml jar and add 1 ml of zinc acetate (22%) and 1 ml of NaOH (6N). Make up the solution to 100 ml without any air bubbles and mixed by rotating back and forth vigorously about a transverse axis. Filter the cake and dissolve the cake in 100 mk DI water by adding 1:1 HCl of 2-3 ml. Added 0.025 N iodine solution to get the obvious yellow coloration and few starch solution drops added to get blue coloration. Titration was carried out using hypo solution of 0.025 N.

Catalysts

Zeolites are microporous crystalline aluminosilicate solids with well-defined channels and cavities having window diameters <10 nm. The aluminosilicate framework is negatively charged and is polyhedral by extra-framework cations. Advantage of zeolite framework is could accommodate molecules and ions. Therefore, zeolites have been widely used and studied as ion exchangers, sorbents, and catalysts in industrial processes. The extra-framework cations present in zeolites play a significant role in determining their adsorption and catalytic properties. Zeolite X is a synthetic aluminium-rich analogue of the naturally occurring mineral faujasite.

The framework structure of zeolite X primarily contain Silicon and aluminium atoms alternate at the tetrahedral intersections, except that Si substitutes for Al at about 4% of the Al positions bonded with oxygen atoms. The zeolite X frame work consists of sodalite cavity or β-cage as its principal building block. Typically, the β-cages are connected tetrahedrally with six-rings via bridging oxygen yielding double six-rings (and, interconnected set of even larger cavities accessible in three dimensions through 12-ring windows. The Si and Al atoms occupy the vertices of these polyhedral and the oxygen atoms lie approximately midway between each pair of Si and Al atoms but are displaced from those points to give near-tetrahedral angles of Si and Al. Exchangeable cations that balance the negative charge of the alumina silicate framework are found within the zeolite cavities.

Cation Exchange

The sodium cations of the commercial zeolite X were re-placed with various alkali and alkaline earth metal cations by ion exchange with potassium, rubidium, caesium, magnesium, calcium, strontium, and barium salt solution at 353 K separately or in combination. The ion-exchange process was repeated several times to achieve the higher replacement of sodium ions with other alkali and alkaline earth metals. Cobalt cations were introduced into highly crystalline zeolite X by the cobalt ion exchange from aqueous solution.

Preparation of Cobalt Zeolite-X 2 gm zeolite-X is taken in glass beaker and solution of 0.05M cobalt nitrate hexahydrate in 280 ml water with a ratio of 1:80. Mixed zeolite-X sample and heated it on heater for 4 h at 80° C. with constant stirring. Filter and wash the cake with hot distilled water. Kept the resultant solid for drying at a temperature 110° C. overnight and followed by calcination at 450° C. for 3 h.

Preparation of Sodium Cobalt Zeolite-X

Sodium chloride 1M solution in 20 ml water was prepared and mixed with 2 gm zeolite-X in water. Reflux heated for 4 hours at 80° C. with constant stirring. The resultant solution was filtered and kept the solid at 110° C. for overnight drying. 0.05 M in 320 ml water of cobalt nitrate hexa-hydrate solution, mix 4.65 gm of cobalt nitrate hexahydrate. Maintain the solid/liquid ratio 1:80. Mix the sodium zeolite-X with cobalt nitrate hexa-hydrate and heat it 4 hours at 80° C. under constant stirring. After filtering the solution, washed with hot water.

Preparation of Potassium Cobalt Zeolite-X

A solution of potassium nitrate 1M solution in 20 ml water was added to 2 gm zeolite-X. Heat for 4 hours at 80° C. under constant stirring. The filtered solid of potassium zeolite-X was washed hot water. The resultant solid is kept for drying at 110° C. overnight. A solution of 0.05M cobalt nitrate hexahydrate in 240 ml water with a ratio 1:80 was maintained.

Other metal modified Zeolite-X such as Ba and Sr were synthesized the methods similar to the above.

Preparation of Strontium Zeolite X

About 0.5 gm of zeolite which has silica alumina ratio 84, 187, 272 and 408 was added to nearly 2 ml of distilled water. Mix the zeolite sample in water very well for about half an hour. Add 0.5% (by weight) of Sr in zeolite sample, the weight of $Sr(NO_3)_2$ is 0.6231 g. Mix the solution of $Sr(NO_3)_2$ and zeolite sample for 1 h. Heat the solution on heater at low temperature. The samples were calcined at 400° C. in furnace for 4 h.

Other metals (Cs, Ba) modified zeolite X prepared in the similar method described above.

Impregnation

Impregnation as a means of supported catalyst preparation is achieved by filling the pores of a support with a solution of the metal salt from which the solvent is subsequently evaporated. The catalyst is prepared either by spraying the support with a solution of the metal compound or by adding the support material to a solution of a suitable metal salt, such that the required weight of the active component is incorporated into the support without the use of excess of solution. This is then followed by drying and subsequent decomposition of the salt at an elevated temperature, either by thermal decomposition or reduction. When used for the preparation of mixed metal catalysts, care has to be taken to confirm that a component in an impregnating solution of metal salts is not selectively adsorbed, resulting in an unexpectedly different and undesirable concentration of metals in a mixed-metal catalyst. This technique has been widely used for the preparation of small amounts of catalyst for basic studies.

Hydroxyapatites as Novel Catalysts for the Removal of Sulphides

CaHAP crystallizes with hexagonal $P6_{3/m}$, symmetry with $Ca^{2+}$ arranged in two non-equivalent sites, I and II, with Ca (I) ions aligned in columns whereas Ca(II) ions are in equilateral triangles centred on a screw axis surrounded with $PO_4^{3-}$ tetrahedra. CaHAP exhibits both acid-base properties in its crystal lattice accompanied by important properties such as high adsorption capacity and ion-exchange capabilities.

Synthesis of Calcium Hydroxyapatites:

CaHAP Using $NH_4H_2PO_4$ as Precursor

A solution of calcium nitrate tetrahydrate ($Ca(NO_3)_2 \cdot 4H_2O$) ($6.67 \times 10^{-2}$ mol) in 60 ml $H_2O$ was prepared and brought to pH 11-12 with $NH_4OH$ (4.98 N), addition and further diluted to 120 ml. A solution of ammonium dihydrogen phosphate ($NH_4H_2PO_4$) ($4.00 \times 10^{-2}$ mol) in 100 ml of $H_2O$ was prepared and brought to pH 11-12 with $NH_4OH$ (4.98 N) and thereafter diluted to 160 ml. The calcium solution was vigorously stirred at room temperature, and the phosphate solution added drop wise over Ca. It takes 30 min to produce a milky, gelatinous precipitate which was stirred and boiled at 70° C. for 1 h. The precipitate was filtered, washed, dried at 80° C. overnight and lastly calcined at 500° C. for 3 h. The preparation reaction can be explained as follows:

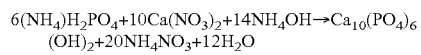

$$6(NH_4)H_2PO_4 + 10Ca(NO_3)_2 + 14NH_4OH \rightarrow Ca_{10}(PO_4)_6(OH)_2 + 20NH_4NO_3 + 12H_2O$$

In order to study the effect of Ca to P ratio and the effect of metal addition to the hydroxyapatite framework the following list of catalysts have been synthesized using similar methods of calcium hydroxyapatite catalysts. As the acidic and basic properties of these materials changes with metal to phosphorous ratio, we have systematically varied the metal (Ca) to phosphorous ratio in the 1.1 to 2.16. Various metals modified CaHaP catalysts have been synthesized using Sr, Ba. Co (10 wt %) is impregnated on these supports. For comparison SrHaP support has been synthesized with Sr to P ratio of 1.1 to 2.16. SrHaP support structure has been confirmed using x-ray diffraction method. SrHaP has been further modified using Ba and Ca. Co (10 wt %) is impregnated on these supports.

The following non-limiting examples illustrate in details about the invention. However, they are not intended to be limiting the scope of present invention in any way.

Example 1

The refinery spent caustic feed without any pretreatment with sulfidic content of 3140 ppm is used for the experiment to remove sulfides. The reaction conditions are as follows: spent caustic: 50 ml, Catalyst: Co—X zeolite and CoCaHAP, amount of catalyst: 50 mg, Oxidant: zero air, Temperature: 80° C. The results of various catalysts evaluated for removing sulfides has been presented in the Table 1. A maximum 58% conversion is achieved over Co—X zeolite using 50 mg catalyst at reaction temperature of 80° C. at atmospheric pressure.

TABLE 1

| Catalyst | Reaction temperature, ° C. | Amount of catalyst, mg | % S removal |
|---|---|---|---|
| Co—X | 80 | 50 | 58 |
| Co—X | 60 | 50 | 23 |
| CoCaHAP | 50 | 20 | 10 |
| CoCaHAP | 60 | 50 | 25 |
| CoCaHAP | 80 | 50 | 42 |
| Co—NaX | 80 | 50 | 54 |
| Co—SrX | 80 | 50 | 59 |

Example 2

In order to study the effect of high temperature and pressure sulphides removal is conducted at 80 to 100° C. at 10 bar zero air pressure. The results are presented in the Table 2.

TABLE 2

| Spent Caustic (mL) | Catalyst | Catalyst, mg | Temperature (° C.) | Air Pressure (bar) | Sulfides Conversion |
|---|---|---|---|---|---|
| 30 | Co—X | 50 | 80 | 10 | 61.25 |
| 30 | Co—X | 50 | 100 | 10 | 76.25 |
| 30 | Co—X | 50 | 120 | 10 | 92.5 |
| 30 | Co—X | 50 | 120 | 10 | 91.25 |
| 30 | Co—X | 100 | 120 | 10 | 68.75 |

Example 3

The refinery spent caustic feed without any pretreatment with sulfidic content of 3140 ppm is used for the removal sulfides. The reaction conditions are as follows: spent caustic: 50 ml, amount of catalyst: 10-1000 mg, oxidant: zero air, Reaction temperature: 50-150° C., pressure atomspheric to 60 bars. The results of various catalysts evaluated for removing sulfides has been presented in the Table 3. A maximum 92% conversion is achieved over Co-CaHAP zeolite using 100 mg catalyst at reaction temperature of 150° C. at 60 bar pressure. The gas products were analyzed using the RGA and no significant amounts of $H_2S$, $SO_2$, and SO3 were observed.

TABLE 3

| Catalysts | Catalyst, mg | Spent caustic, ml | Pressure, bar | Temperature, ° C. | Sulphide Conversion % |
|---|---|---|---|---|---|
| Co—X | 100 | 25 | 60 | 120 | 66 |
| Co—X | 100 | 25 | 30 | 120 | 43 |
| Co—X | 100 | 25 | 15 | 120 | 37 |
| Co—CaHAp | 100 | 25 | 60 | 150 | 94 |
| Co—CaHAp | 100 | 25 | 30 | 150 | 66 |
| Co—CaHAp | 100 | 25 | 15 | 150 | 57 |
| Cu—X | 100 | 25 | 60 | 150 | 70 |
| Cu—X | 100 | 25 | 30 | 150 | 57 |
| Cu—X | 100 | 25 | 15 | 150 | 43 |
| — | | 25 | 60 | 150 | 31 |
| — | | 25 | 30 | 150 | 14 |
| — | | 25 | 15 | 120 | 13 |

Example 4

Figure 2:
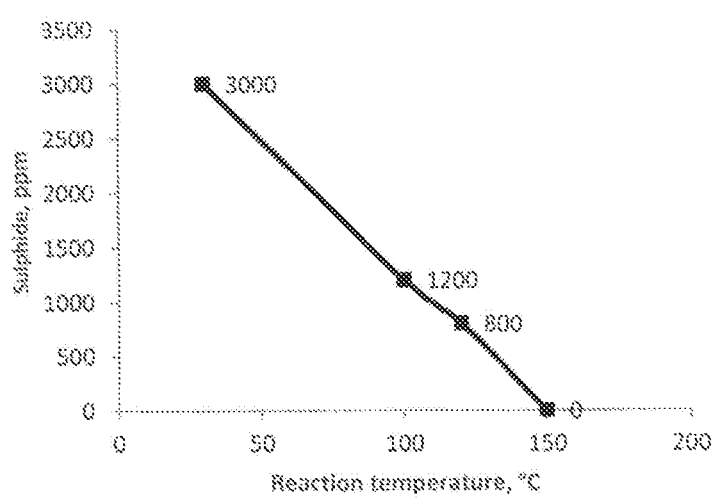
FIG. 2: graph illustrating the effect of reaction temperature in the wet air oxidation of $Na_2S$ (3000 ppm) solution at various reaction temperatures and 6 bar zero air pressure over $Cu/Al_2O_3$ catalyst.
Figure 3:
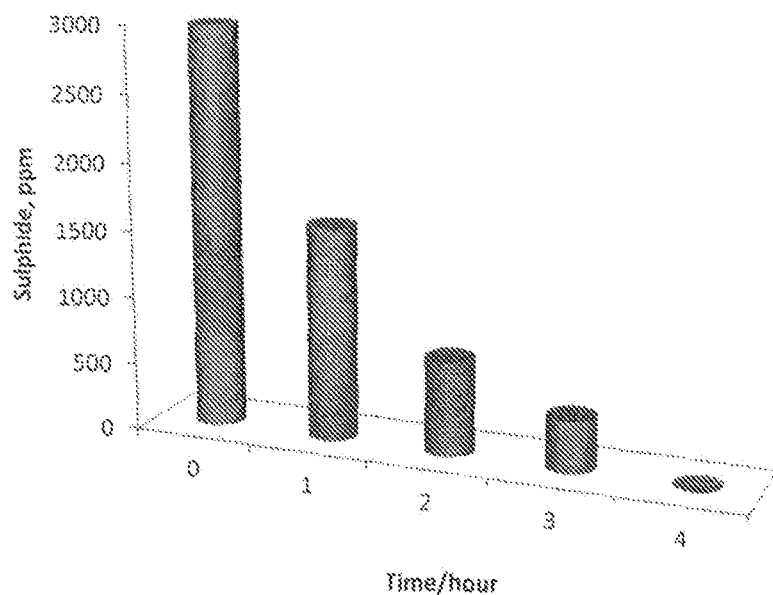
FIG. 3: graph illustrating the effect of reaction duration in the wet air oxidation of $Na_2S$ (3000 ppm) solution at 150° C. and 6 bar zero air pressure over $Cu/Al_2O_3$ catalyst.

In order to study the effect of the contaminants the simulated $Na_2S$ of 5000 ppm feed is prepared. This solution (50 ml) is used for the CWAO on $Cu/Al_2O_3$ catalyst of 50 mg at 150° C. and 6 bar air pressure over the 4 h reaction duration and a complete removal of sulfide is achieved. Similar result is also obtained over Co/CaHAP at high zero air pressures (above 20 bar). FIGS. 2 and 3 shows the results on $Cu/Al_2O_3$ catalyst treating 3000 ppm $Na_2S$ aqueous solution at 150° C. and 6 bar zero air pressure.

Example 5

The refinery spent caustic with 3140 ppm of sulfides is pretreated with required quantities of $H2SO4$ and a reduction of 62% sulfides is observed. This followed with treating the above solution on activated carbon has further reduced the sulfides content up to 70%. The above stock solution is used for the reaction over Cu/X, Co/X, Co/CaHAP, $Cu/Al_2O_3$, $Co/Al_2O_3$ catalysts at 150° C. and 6 bar zero air pressure, above 98% total removal of the sulfides achieved.

Example 6

Figure 4:
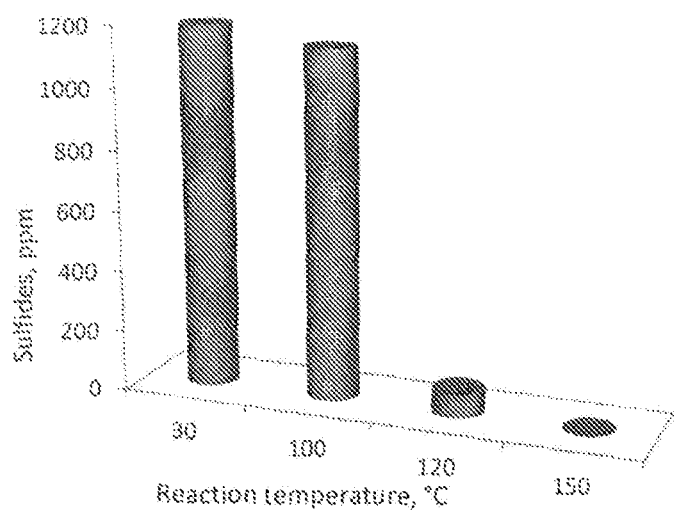
FIG. 4: graph illustrating the effect of reaction temperature in the wet air oxidation of treated spent caustic at various reaction temperatures and 6 bar zero air pressure over $Cu/Al_2O_3$ catalyst.
Figure 5:
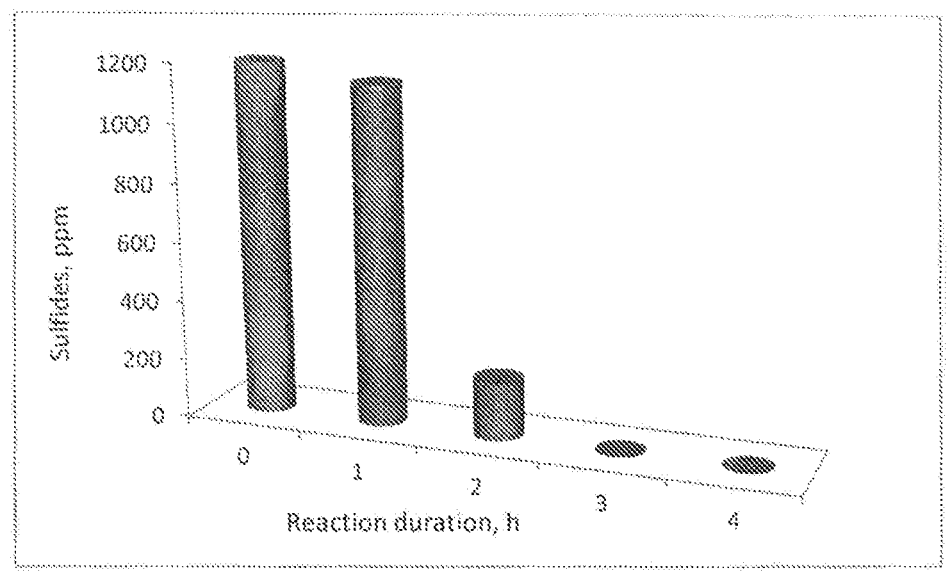
FIG. 5: graph illustrating the effect of reaction duration in the wet air oxidation of pretreated spent caustic solution at 150° C. and 6 bar zero air pressure over $Cu/Al_2O_3$ catalyst.

The pretreated spent caustic with sulfidic contents with $H_2SO_4$ followed by the adsorption on activated carbon is used for carrying out catalytic wet air oxidation. The $Cu/Al_2O_3$ has showed more than 98% conversion at 120° C. FIG. 4 shows the CWAO treatment of refinery spent caustic using $Cu/Al_2O_3$ catalyst at various reaction temperatures and 6 bar pressure. The time on stream studies showed that the completed sulfides removal is achieved within 3 h reaction duration (FIG. 5).

Example 7

Lower amounts of sulfides below 200 ppm have been adsorbed on the activated carbon and 10 to 20% sulfides were adsorbed. A process scheme is proposed in the FIG. 1. About 70-90% of sulfidic contents can be converted over the studied catalysts via wet air oxidation. In order to completely remove the sulfides it is proposed to carry out the adsorption over suitable materials such as carbons followed by low amounts of $H_2O_2$.

REFERENCES

S-H. Sheu and H-S. Weng, Wat. Res. 35 (2001) 2017

V. Rathore, S. Gupta, T. S. Thorat, P. V. C. Rao, N. V. Choudary and G. Biju, PTQ, Q3, 2011, 1

A. M. Thomas Jr, U.S. Pat. No. 3,023,084 A

W. Dardenne-Ankringa, Jr, U.S. Pat. No. 3,963,611

D. A. Beula, W. M. Copa, J. A. Momont, U.S. Pat. No. 5,082,571 A

D. A. Jenson, A. Z. Jezak, A. O. Massey, U.S. Pat. No. 5,246,597 A

I. Zermeño-Montante, C. Nieto-Delgado, R. D. Sagredo-Puente, M. G. Cárdenas-Galindo, B. E. Handy, Topics in catalysis 54(2011)579

The invention claimed is:

1. A process for the removal of sulphides in spent caustic comprising: conducting wet air oxidation on the spent caustic in the presence of a catalyst composition, wherein the catalyst composition comprises a support material and a modifying agent, wherein the modifying agent comprises Co or Cu, and the support material is present in an amount from 2 wt % to 50 wt %; wherein the wet air oxidation is carried out at a temperature from 60° C. to 200° C. with a reaction duration between 1 hour to 8 hours;

wherein the support material is a bulk oxide, metal phosphate, or a zeolite with varying Si/Al ratios between 20 to 280;

wherein the bulk oxide is alumina, zirconia, titania, silica, niobia, or a combination thereof;

wherein the zeolite is a faujazite-type zeolite which is a X type zeolite;

wherein the metal phosphate is a Hydroxyapatite;

wherein the catalyst composition has a surface area of 20 $m^2/g$ to 700 $m^2/g$ and a pore volume of 0.10 cc/g to 1.5 cc/g;

wherein the process comprises steps of adsorption followed by neutralization;

wherein the neutralization step adjusts pH between 5 to 7.5; and wherein the removal of sulphides is above 90% with respect to the spent caustic.

2. The process of claim 1, wherein the modifying agent is anchored, impregnated, exchanged, or contacted to a surface of the support material in or outside of pores of the support material.

3. The process of claim 1, wherein the Co or the Cu is present in an amount of up to 20.0 wt %.

4. The process of claim 1, wherein the process converts sulfidic content in the spent caustic or diluted spent caustic.

5. The process of claim 1, wherein the process further comprises adsorption of sulphides on different carbon forms.

* * * * *